March 11, 1958
F. R. ELLENBERGER
2,826,749
HOUSING AND STABILIZED MOUNTING FOR
UNDERWATER SOUND APPARATUS
Filed Oct. 1, 1945
3 Sheets-Sheet 2
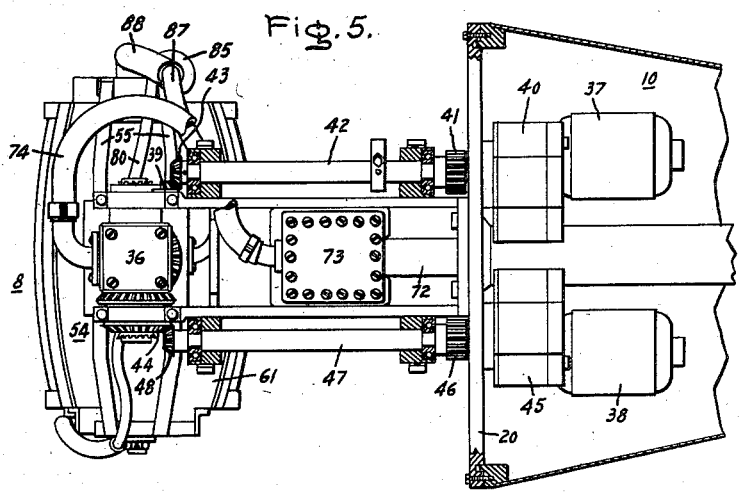
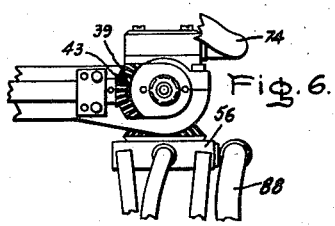
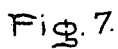
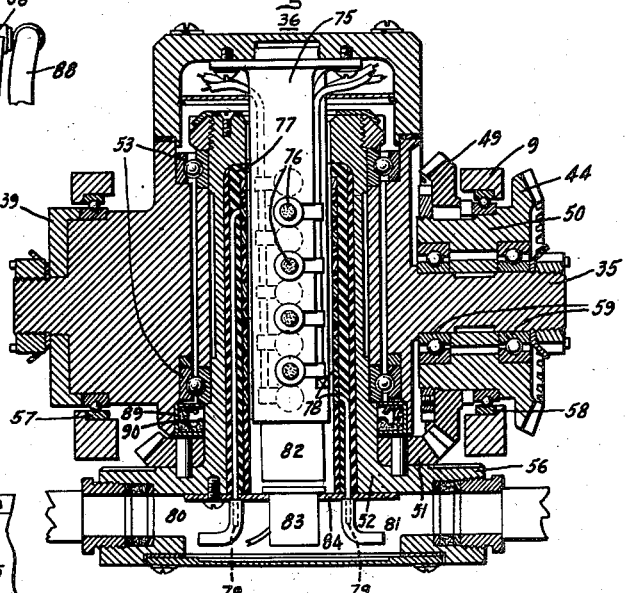
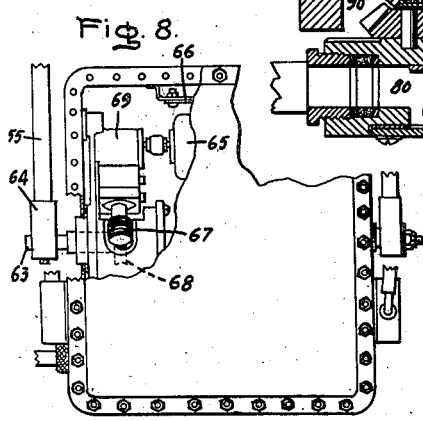
Inventor:
Francis R. Ellenberger
by *Milton D. Moore*
His Attorney.

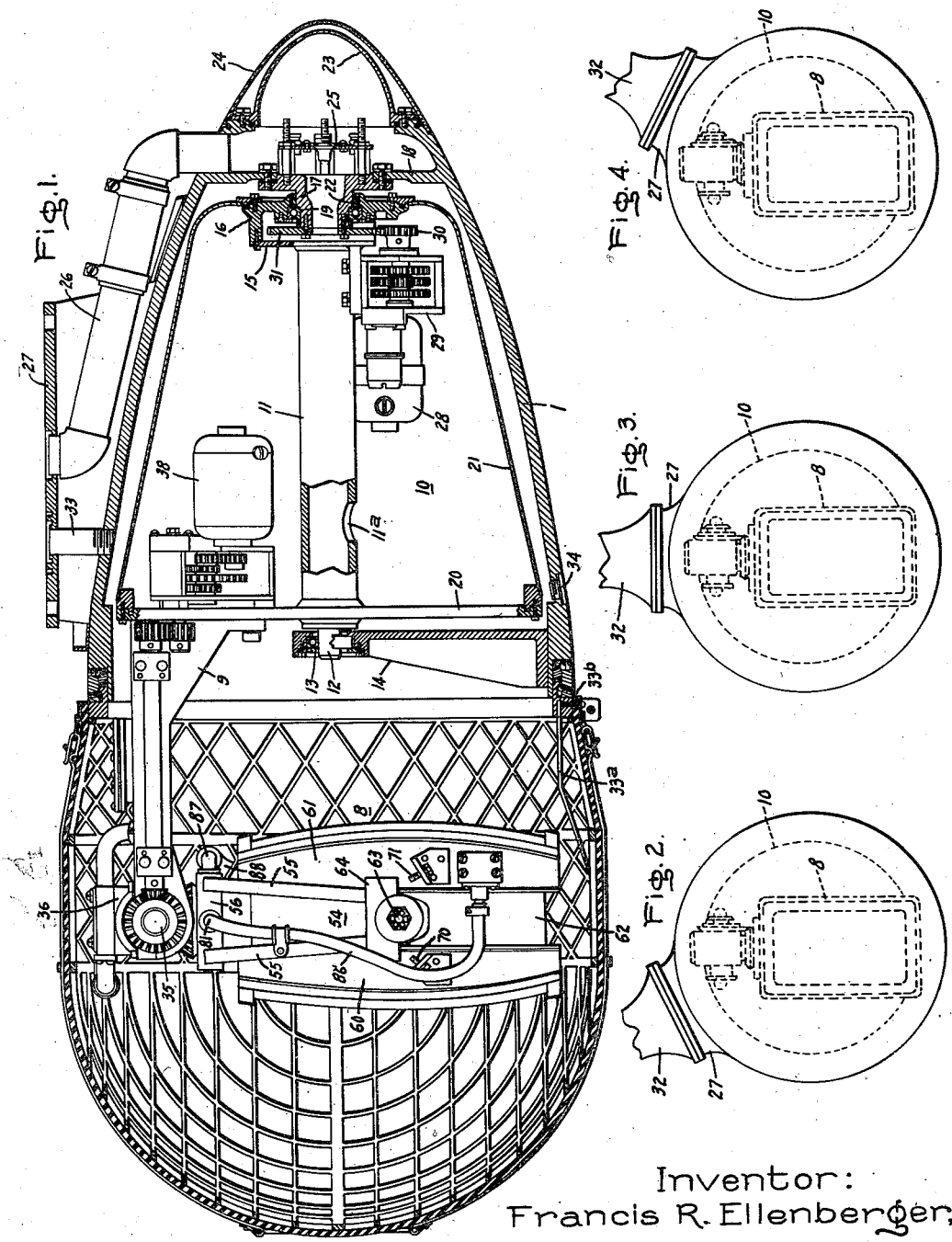

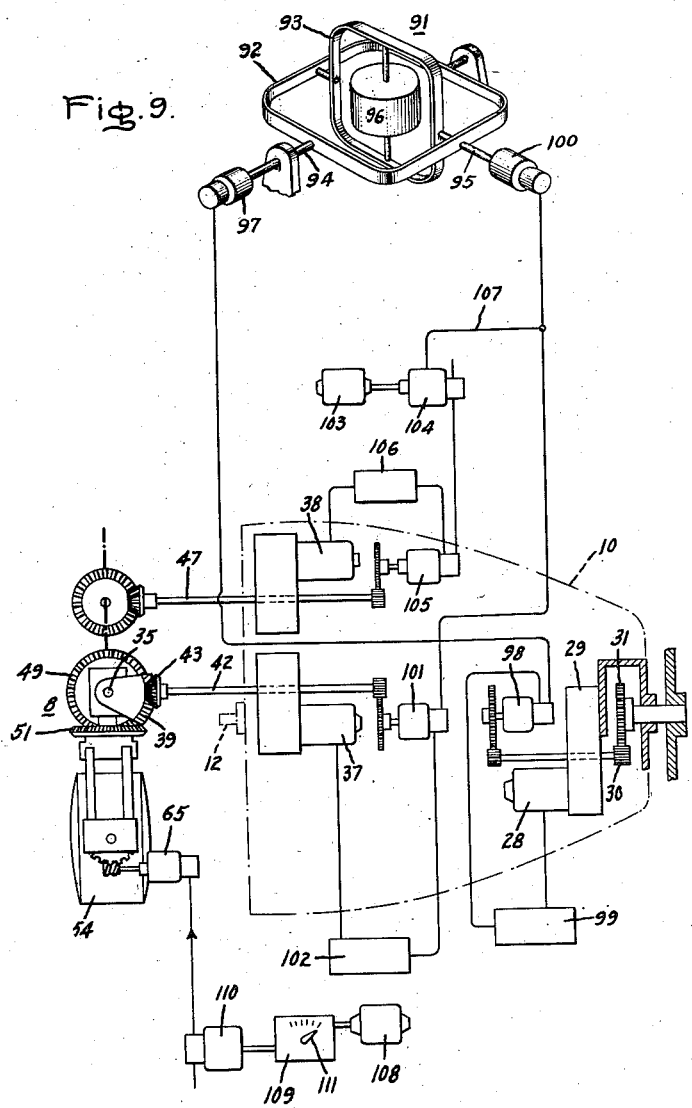

United States Patent Office 2,826,749
Patented Mar. 11, 1958

2,826,749

HOUSING AND STABILIZED MOUNTING FOR UNDERWATER SOUND APPARATUS

Francis R. Ellenberger, Schenectady, N. Y., assignor to General Electric Company, a corporation of New York Application October 1, 1945, Serial No. 619,642

8 Claims. (Cl. 340—8)

This invention relates to a sound apparatus for locating objects under water and particularly to the mounting and stabilizing of the transducers for such apparatus.

Apparatus employing supersonic wave energy under water may be arranged to investigate an area of the ocean floor or a particular volume around a vessel on which the apparatus is mounted. An apparatus for this purpose is described and claimed in a copending application Serial No. 619,720 filed concurrently herewith in the name of Cramer W. La Pierre et al. and assigned to the same assignee as the present invention. This type of equipment employs electroacoustic transducers for transmitting the sound energy and for receiving echoes from objects in the field under investigation. Because relatively narrow, highly directive beams are utilized, these transducers must be stabilized so that they are not subject to angular motion because of the rolling and pitching of the vessel on which the apparatus is mounted. Furthermore, it is desirable to arrange the transducers within closed housings having minimum resistance to movement of the water in the direction of movement of the vessel. Certain control equipment, such as the driving motors for stabilizing the transducer, must be located in the fluid-tight housing and it is desirable that water or other liquid surrounding the working parts be positively prevented from entering the casing or other containers in which they are mounted. Accordingly, it is an object of this invention to provide an equipment for transmitting or receiving sound under water including an improved arrangement for mounting the control motors and other apparatus for actuating the equipment.

It is another object of the invention to provide a mounting for electroacoustic transducers or the like for operation under water including an improved arrangement for maintaining the transducers stabilized in a desired position regardless of rolling of the vessel to which the equipment is attached.

It is another object of this invention to provide a mounting for electroacoustic transducers or the like for operation under water including an improved arrangement for maintaining the transducers stabilized regardless of rolling of the vessel and for rotating and pointing the transducers in desired directions to determine the zone of operation of said transducers.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which Fig. 1 is a sectional side elevation of an underwater housing for an electroacoustic transducer including a mounting embodying the invention; Figs. 2, 3 and 4 are diagrammatic end views of the housing shown in Fig. 1 illustrating three angular positions thereof during rolling of the vessel; Fig. 5 is a plan view, partly in section, of the transducer mounting shown in Fig. 1; Fig. 6 is a view of a portion of the mounting on the opposite side of that shown in Fig. 1; Fig. 7 is an enlarged sectional view of the bearing and slip ring assembly for the transducer of Fig. 1; Fig. 8 is a front elevation, partly broken away, of the transducer shown in Fig. 1; and Fig. 9 is a diagrammatic view of the stabilizing control of the apparatus of Fig. 1.

Briefly, the apparatus illustrated in the drawings comprises a waterproof housing of streamlined or teardrop form adapted to be supported from a vessel under water with its principal axis in the direction of movement of the vessel. The stabilizing motor drives are included within the housing and the control cables may be connected through a suitable duct to equipment on the vessel. An electroacoustic transducer is mounted on a bracket extending from a drum or barrel which is stabilized to prevent changes in position of the transducer due to rolling of the vessel. The transducer is also stabilized about an axis at right angles to the roll axis to correct for movements due to pitching of the vessel. The transducer is rotated about a vertical axis during operation in order to scan a predetermined volume of water in the neighborhood of the vessel. The control motors and other moving parts of the control located within the housing are enclosed in a separate sealed system which prevents leakage into the sealed system of the sound transmitting fluid which fills the housing. The spaces in which the control equipment is located are supplied with dry air or other suitable gas under pressure to prevent leakage.

Referring now to the drawings, the apparatus illustrated in Fig. 1 comprises the drum 10 comprising a hollow shaft 11 having a reduced diameter solid extension portion 12 secured to the drum in alinement therewith and mounted in a roller bearing 13 in an upright bracket 14 secured to the casing 1. The other end of the shaft 11 is secured to a plate 15 which in turn is fastened to a flanged disk 16; and the disk 16 is mounted on a sleeve or boss 17 secured to an internally extending flange 18 at the end of the casing 1, a ball bearing assembly 19 being provided between the disk 16 and the boss 17. The shaft 11 is thus mounted for rotation about an axis parallel to the axis of roll of the vessel. A disk or plate 20 is secured to the end of the shaft 11 near the bearing 13 and a sheet metal shell or housing 21 is secured to the plate 20 and to the disk 16, the joints between the casing and the plate and disk being made fluid tight. In order to seal the drum 10 against leakage through the ball bearing 19, a suitable resilient shaft seal 22 is provided within the disk 16 outside the bearing assembly 19. The end of the housing 1 is closed by a movable cap or dome 23 and a streamlined cover 24. An electrical connection support or terminal board 25 is arranged on the boss 17 within the space at the end of the casing 1 within the dome 23, and electric supply cables and control leads may be brought to the board 25 through a conduit 26 extending from a bracket 27 outside the casing and providing communication between the space within the dome 23 and with the interior of the drum through the hollow boss 17. These electric leads are carried through the hollow shaft and may be brought through openings such as that indicated at 11a.

In order to maintain the drum 10 in a predetermined position, normally in a position to maintain the bracket 9 at the highest point in the housing, an electric motor 28 is mounted on a gear box 29 rigidly secured to the supporting plate 15 and arranged to drive a pinion 30 to move the drum about a gear 31 rigidly secured to the boss 17. The motor 28 is controlled in accordance with the roll of the vessel and in a manner to be described later so that it operates to maintain the drum 10 in a predetermined fixed position regardless of rolling of the vessel. As indicated in Figs. 2, 3 and 4, the transducer assembly 8 is maintained upright because it is secured to the stabilized drum 10 regardless of the position of the housing 1 as it is shifted during rolling of the vessel. In Fig. 2 the vessel has rolled to starboard, in Fig. 3 it is upright, and in Fig. 4 the vessel has rolled to port. In each of these figures a supporting arm between the vessel and the housing 1 has been indicated at 32 and this arm remains fixed with respect to the vessel.

The space within the housing surrounding the drum 10 and the transducer assembly 8 is filled with a suitable liquid, such as a water solution of sodium chromate, which has sound transmitting characteristics similar to those of water but which does not tend to corrode the equipment within the housing. The housing thus provides a streamlined casing for minimizing the resistance of the apparatus to its passage through water during movement of the vessel and insures operation of the transducer assembly in a body of liquid not disturbed by movement of the vessel. The arrangement also prevents corrosion of the apparatus within the housing which would be caused if it were immersed, for example, in sea water. The sodium chromate solution is admitted to the casing through a connection 33 arranged in the bracket 27 so that the solution may be carried to the housing through the supporting arm 32. When it is desired to drain the chromate solution back into its container aboard the vessel, the housing is arranged to be inverted and a plug 34 may be removed from the side opposite the connection 33 in order to admit air to the interior of the housing and facilitate drainage of the solution back through the connection 33. A vent tube and plug, as indicated at 33a and 33b, respectively, permit filling the hose completely as a portion of it is above level of plug 34 when inverted.

In order to stabilize the transducer assembly 8 against movement due to pitching of the vessel, the assembly is mounted for rotation about the axis of a shaft 35 in the head 36 of the transducer. This mounting arrangement for stabilizing the transducer against pitching of the ship and including the pendulous mounting of the transducer is described and claimed in a copending application Serial No. 619,643 filed concurrently herewith in the name of George W. Kessler and assigned to the same assignee as the present invention. The transducer assembly is thus mounted for pendulous motion about the end of the bracket 9 and the pitch correction thus provided in cooperation with the movement of the barrel 10 with respect to the housing to correct for roll insures the maintaining of the transducer 8 in a stable position regardless of rolling and pitching of the vessel. During operation the transducer assembly 8 is also rotated about a vertical axis passing through the head 36. The motors for driving the transducer assembly to correct for pitch and to provide the rotation thereof are mounted within the drum 10, the pitch correction motor being indicated at 37 and the rotation motor at 38. The motor 37 drives a gear segment 39 on the shaft 35 through a reduction gearing 40, a pair of pinion gears 41, a shaft 42, and a bevel pinion 43 engaging the sector 39. The motor 38 drives a gear 44 through a reduction gearing 45, pinions 46, shaft 47, and a bevel pinion 48. The connections between the reduction gearings within the drum 10 and the pinions 41 and 46 rotate in fluid-tight seals (not shown) and mounted in the plate 20. When the motor 38 drives the gear 44, the transducer is rotated about its vertical axis through a bevel gear 49 secured to an extended hub 50 on the gear 44 and which engages a similar bevel gear 51 secured to a rotatable sleeve 52 mounted within the head 36 on a bearing assembly 53. The transducer assembly 8 includes a transducer unit 54 suspended from the head 36 on arms 55 providing a downwardly opening U-shaped bracket secured to the sleeve 52, the lower portion of which is an integral block or base 56 of rectangular cross section.

The transducer unit 54 thus may swing pendulously within the bracket 9 on ball bearing assemblies 57 and 58 mounted within the left- and right-hand brackets as viewed in Fig. 7, the bearing assembly 57 being mounted directly on the head 36 and the bearing 58 on the hub 50 of the gear 44 which in turn is mounted in ball bearing assemblies 59 on the shaft 35. The transducer 54 may also be rotated about an upright axis within the head 36 by operation of the gears 44, 49 and 51.

The transducer unit 54 comprises two transmitting transducers 60 and 61 mounted back to back on a casing or housing 62 which is constructed to provide a fluid-tight chamber between the two transducers. Two transducers are employed in order that either of two selected frequencies may be utilized, it being desirable under some conditions to operate at a lower frequency in order to increase the range of the equipment and under other conditions to operate at a higher frequency in order to increase the accuracy of the equipment. The transducers 60 and 61 are of a type designed to transmit a relatively wide beam of supersonic energy and during the operation of the apparatus it is desirable to vary the declination of the beam in order to investigate objects in the water at different angles. For examples, at one time an object under investigation may be directly forward of the vessel and at another time it may be desirable to examine the ocean floor. In order to change the declination of the transducer unit 54, it is secured between the arms 55 on stub shafts 63 rigidly mounted in blocks 64 at the lower ends of the arms. The structural features of the transducer 61 are similar to the transducer described and claimed in copending application Serial No. 619,722, filed concurrently herewith in the names of William H. Janssen and Richard W. Samsel and assigned to the same assignee as the present invention. The stub shafts extend to the interior of the casing 62 and the unit may be rotated with respect to the arms 55 by operation of a selsyn motor 65 secured in the housing 62 on a bracket 66 and arranged to drive a worm 67 and rotate the housing about a stationary gear 68 through a reduction gearing 69. The limits of declination about the shafts 63 are determined by adjustable stops 70 and 71 secured on the outside of the transducer housings 60 and 61, respectively, and arranged to engage the adjacent block 64 at the maximum permissible positions in the two directions of rotation about the shaft 63.

In order to carry the electrical connections to the motor 65 and to the transducers 60 and 61, sealed conduits are provided, a hollow connection 72 being provided between the interior of the casing 10 and a connection or terminal box 73 which is provided with a removable cover so that during servicing of the apparatus, connections may be broken between the interior of the casing 10 and the transducer assembly 8. The electrical leads (not shown) are carried to the transducer head 36 from the box 73 through a flexible conduit 74 and reach the interior of the head 36 which is provided with a downwardly extending post 75 of insulating material and in which a plurality of brushes 76 are mounted. Encircling the post 75 and rigidly mounted in the sleeve 52 is an insulating sleeve 77 provided with a plurality of spaced slip rings 78 each arranged to engage one of the brushes 76. The leads from the slip rings, two of which are indicated at 79, pass longitudinally through the sleeve 77 and into passages 80 and 81 in the block 56. It is thus apparent that the sleeve 52 may rotate within the head 36 without interruption of electrical connections. The high frequency connections to the transducers may, if desired, be made through an inductive coupling, generally indicated by a primary member 82 secured to the lower end of the post 75 and a secondary member 83 secured in a plate 84 at the lower end of the insulating sleeve 77 within the block 56. The connections to the transducer 60 are made through a flexible conduit 85 connecting the passage 80 and the interior of the transducer 60, and the leads to the transducer 61 are carried through a flexible conduit 86 connecting the passage 81 and the interior of the transducer 61. The leads for controlling the selsyn motor 65 within the housing 62 are carried from a passage (not shown) in the block 56 and thence through a connection 87 and a flexible conduit 88 to the interior of the housing 62. All of the passages and flexible conduits between the casing 10 and the transducers 60 and 61 and the casing 62 are made fluid tight. All these spaces are arranged to be filled with a suitable gas, such as dry air or nitrogen, which is maintained under sufficient pressure to prevent the leakage of the sodium chromate or other solution into the control chambers of the apparatus. In order to seal the space within the head 36 between the stationary parts of the head and the rotating sleeve 52, a shaft seal 89 similar to the seal 22 at the rear end of the casing 10 is provided. This seal includes an annular flexible rubber shoulder 90 which engages the rotating sleeve 52 and is arranged so that the pressure of the gas within the head increases the effectiveness of the seal. The gas under pressure may be admitted from a suitable supply in the vessel through the connection 26 and the hollow boss 17 to the casing 10 and thence to the several conduits of the transducer assembly. It will thus be apparent that a stabilizing equipment has been provided which makes it possible to maintain an electroacoustic transducer in a desired stable position under water with minimum likelihood of damage to the stabilizing equipment due to leakage of water or other liquid into the control chambers.

The mechanism for controlling the apparatus shown in Fig. 1 in order to maintain the transducer assembly stabilized in a desired position is shown diagrammatically in Fig. 9 where the drum 10 has been indicated by a dotted outline, parts of the apparatus within the drum being shown within the outline. The power supply circuits have been omitted from the drawing to avoid unnecessary complication, the manner of applying power to control circuits of the type indicated being well known in the art. The stabilizing equipment includes a gyroscope 91 arranged in accordance with well-known practice in a Cardan mounting which includes gimbal rings 92 and 93 which rotate about axes 94 and 95, respectively, in accordance with the roll and pitch of the vessel, the gyroscope rotor indicated at 96 rotating continuously about a vertical axis throughout the operation of the equipment. When the vessel rolls the rotation of ring 92 about its axis 94 drives a selsyn 97 and transmits a signal to a selsyn 98 which is geared directly in a 1:1 ratio to the drum 10. The selsyn 98 thereupon transmits a signal to a servo amplifier equipment 99 which drives the motor 28 to rotate the drum 10 until the selsyn 98 is in the same position as the selsyn 97. The operation of the selsyns 97 and 98 is such that the motor 28 is driven substantially simultaneously with the rolling of the vessel, as indicated by the gyroscope, and the drum 10 is maintained stable regardless of the rolling of the vessel. In a similar manner the transducer assembly 8 is moved pendulously about the axis of the shaft 35 in accordance with pitch, this latter control being effected through a selsyn 100 driven by the gimbal ring 93 and arranged to control the motor 37 through a followup selsyn 101 and a servo amplifier equipment 102. The rotation of the transducer unit 54 is controlled by a driving motor 103 which drives a selsyn 104 and thereby controls the rotation of the motor 38 through a followup selsyn 105 and a servo amplifying equipment 106, the selsyn 105 being geared directly to the shaft 47 which drives the transducer. As explained in the aforementioned Kessler application, it is necessary to correct the rotation of the transducer for the pitching movement of the vessel, and the selsyn 104 is therefore constructed as a differential selsyn and a signal from the pitch selsyn 101 is supplied to the selsyn 104 through a cable 107. This control arrangement prevents change in the rate of rotation of the transducer which would otherwise be caused by the pendulous movement of the transducer about the driving gear 49.

The operation of the selsyn motor 65 within the housing 62 is controlled by a driving motor 108 connected through a gearing 109 to a selsyn 110 which is coupled to the selsyn 65. The power required for this drive is sufficiently small and that it is not necessary to employ a servo amplifying equipment and driving motor, the selsyn 65 having sufficient power to rotate the transducer about its pivot 63. An indication of the declination of the transducer is provided by a pointer 111 actuated by the gearing 109.

It will be apparent from the foregoing that the arrangement of the drum 10 for supporting the transducer assembly and for maintaining the assembly stabilized against rolling of the vessel provides a simple construction for effectively sealing all parts of the equipment against leakage of water and other liquid into the working parts and furthermore facilitates the mounting of the transducer for pendulous movement. Control of all the required stabilizing movements and direction adjusting movements may thus be effected from a remote position.

While the invention has been described in connection with a particular type of supersonic equipment, other applications will readily be apparent to those skilled in the art. It is not, therefore, desired that the invention be limited to the specific construction described and illustrated, and it is intended by the appended claims to cover all modifications within the spirit and scope of the invention.

What I claim as new and desire to secure by Letters Patent of the United States is:

1. An apparatus for mounting and stabilizing an electroacoustic transducer under water on a vessel subject to pitching and rolling comprising a substantially water-tight casing arranged to be mounted on the vessel for rotation about an axis parallel to the axis of roll of the vessel, a device to be stabilized arranged to be supported on said casing about an axis parallel to the pitch axis of the vessel, and means including motors arranged within said casing for moving said casing and said device about their respective axes whereby said device may be maintained in a predetermined position regardless of the pitching and rolling of the vessel.

2. An apparatus for mounting and stabilizing an electroacoustic transducer under water on a vessel subject to pitching and rolling comprising a substantially water-tight casing arranged to be mounted on the vessel for rotation about an axis parallel to the axis of roll of the vessel, means in said casing for rotating said casing, a device to be stabilized arranged to be supported on said casing about an axis parallel to the pitch axis of the vessel, and means for admitting gas under pressure to said casing to minimize the likelihood of leakage of fluid into the casing.

3. An apparatus for mounting and stabilizing an electroacoustic transducer under water on a vessel subject to pitching and rolling comprising a closed housing arranged to be mounted on the vessel and to be positioned under water, said housing having a sound transmitting window therein, a substantially water-tight casing mounted in said housing for rotation about an axis parallel to the axis of roll of the vessel, an electroacoustic transducer supported on said casing near said window and on an axis parallel to the pitch axis of the vessel, means including motors arranged within said casing for moving said casing and said transducer about their respective axes whereby said transducer may be maintained in a position for the transfer of sound energy in a predetermined direction regardless of the pitching and rolling of the vessel, and a body of liquid having sound transmitting characteristics similar to water filling said housing about said transducer and said casing.

4. An apparatus for mounting and stabilizing an electroacoustic transducer under water on a vessel subject to pitching and rolling comprising a closed housing arranged to be mounted on the vessel and to be positioned under water, said housing having a sound transmitting window therein, a substantially water-tight casing mounted in said housing for rotation about an axis parallel to the axis of roll of the vessel, an electroacoustic transducer supported on said casing near said window and on an axis parallel to the pitch axis of the vessel, means including motors arranged within said casing for moving said casing and said transducer about their respective axes whereby said transducer may be maintained in a position for transferring sound energy in a predetermined direction regardless of the pitching and rolling of the vessel, a body of liquid having sound transmitting characteristics similar to water filling said housing about said transducer and said casing, means for admitting gas under pressure to the interior of said casing to minimize the likelihood of leakage of the surrounding fluid into the casing, and means arranged for carrying electrical conductors into said casing for controlling said apparatus from a remote position.

5. An apparatus for mounting and stabilizing an electroacoustic transducer under water on a vessel subject to pitching and rolling comprising a closed housing arranged to be mounted on the vessel and to be positioned under water, said housing comprising a rigid shell portion and a dome-shaped portion of material having sound transmitting characteristics similar to water and secured on said shell, a substantially water-tight casing mounted in said shell portion for rotation about an axis parallel to the axis of roll of the vessel, a bracket on said casing extending into said dome portion, an electroacoustic transducer supported on said bracket within said dome portion and on an axis parallel to the pitch axis of the vessel, means including motors arranged within said casing for moving said casing and said transducer about their respective axes whereby said transducer may be maintained in a predetermined position regardless of the pitching and rolling of the vessel, means including a motor within said casing for rotating said transducer about its vertical axis, and a body of liquid having sound transmitting characteristics similar to those of water filling said housing about said transducer and said casing.

6. An apparatus for mounting and stabilizing an electroacoustic transducer under water on a vessel subject to pitching and rolling comprising a substantially water-tight casing arranged to be mounted on the vessel for rotation about an axis parallel to the axis of roll of the vessel, an arm on said casing extending axially therefrom, a supporting assembly having a transducer thereon and arranged to be supported on said arm for pendulous movement about an axis parallel to the axis of pitch of the vessel, means including a motor within said casing for moving said assembly about its supporting axis whereby said assembly may be maintained in a predetermined position regardless of the pitching and rolling of the vessel, means providing a water-tight compartment on said assembly, and means including a motor mounted within said compartment for adjusting the declination of said transducer to determine the direction of transfer of sound energy between said transducer and the surrounding water.

7. An apparatus for mounting an electroacoustic transducer under water comprising a substantially water-tight casing, an arm extending from said casing, a bearing assembly on said arm, a supporting assembly having a transducer thereon and arranged to be mounted in said bearing assembly for rotation with respect to said arm, means including a motor within said casing for rotating said assembly, conduit means for carrying electric leads to said transducer assembly, a slip ring assembly arranged within said bearing assembly, means including a housing for said bearing assembly for enclosing said assembly in a fluid-tight chamber, and means for supplying gas under pressure to said casing and through said conduit to said bearing chamber for preventing leakage of liquid into said casing and chamber.

8. An apparatus for mounting an electroacoustic transducer under water comprising a substantially water-tight casing, an arm extending from said casing, a transducer, a hanger for said transducer, a supporting head for said hanger rotatably mounted on said arm remote from said casing, means including a bearing within said head for affording rotation of said hanger about an axis transverse to the axis of rotation of said head on said arm, housing means for supporting said transducer and providing a fluid-tight chamber, electric driving means in said chamber for adjusting the angular position of said transducer with respect to said hanger, and means including a slip ring assembly in said head for carrying electric leads from said casing to said transducer chamber and for providing a fluid-tight enclosure for the leads between said casing and said transducer chamber whereby said casing and said housing and said chamber and said lead enclosure may be filled with a gas under pressure to minimize leakage of liquid into said apparatus.

References Cited in the file of this patent

UNITED STATES PATENTS

| | | |
|---|---|---|
| 1,318,739 | Fessenden | Oct. 14, 1919 |
| 1,731,776 | Henry | Oct. 15, 1929 |
| 2,019,497 | Kuntze | Nov. 5, 1935 |
| 2,407,697 | Williams | Sept. 17, 1946 |